United States Patent

[11] 3,612,127

[72] Inventor Edward L. Benno
 Route 1, Box 198, Grayslake, Ill. 60030
[21] Appl. No. 880,204
[22] Filed Nov. 26, 1969
[45] Patented Oct. 12, 1971

[54] HAY BALE CUTTER
 6 Claims, 2 Drawing Figs.
[52] U.S. Cl. .................................................... 146/70.1
[51] Int. Cl. ...................................................... A01f 29/00
[50] Field of Search .......................................... 146/70.1,
 123, 98; 143/43; 144/187; 83/201.08, 201.14,
 201.15

[56] References Cited
UNITED STATES PATENTS
| | | | |
|---|---|---|---|
| 3,540,506 | 11/1970 | Newhouse, Jr. .............. | 146/70.1 |
| 2,831,511 | 4/1958 | Hedblom ..................... | 143/43 X |
| 1,908,548 | 5/1933 | Smith .......................... | 146/98 X |

Primary Examiner—Willie G. Abercrombie

ABSTRACT: A hay bale cutter comprising a generally rectangular housing open at opposite ends with a plurality of linear cutters supported exteriorly of the housing and extending through slots in the housing and across the opening through the housing.

PATENTED OCT 12 1971 3,612,127

Inventor:
Edward J. Benno

HAY BALE CUTTER

This invention concerns a simple and portable hay bale cutter for cutting standard rectangular bales of hay into relatively small masses of fragments. The invention involves the combination of a certain housing to receive bales of hay with an arrangement of cutting chain assemblies for efficiently cutting the bales of hay into relatively small and uniform hay masses.

DESCRIPTION

Figure 2:
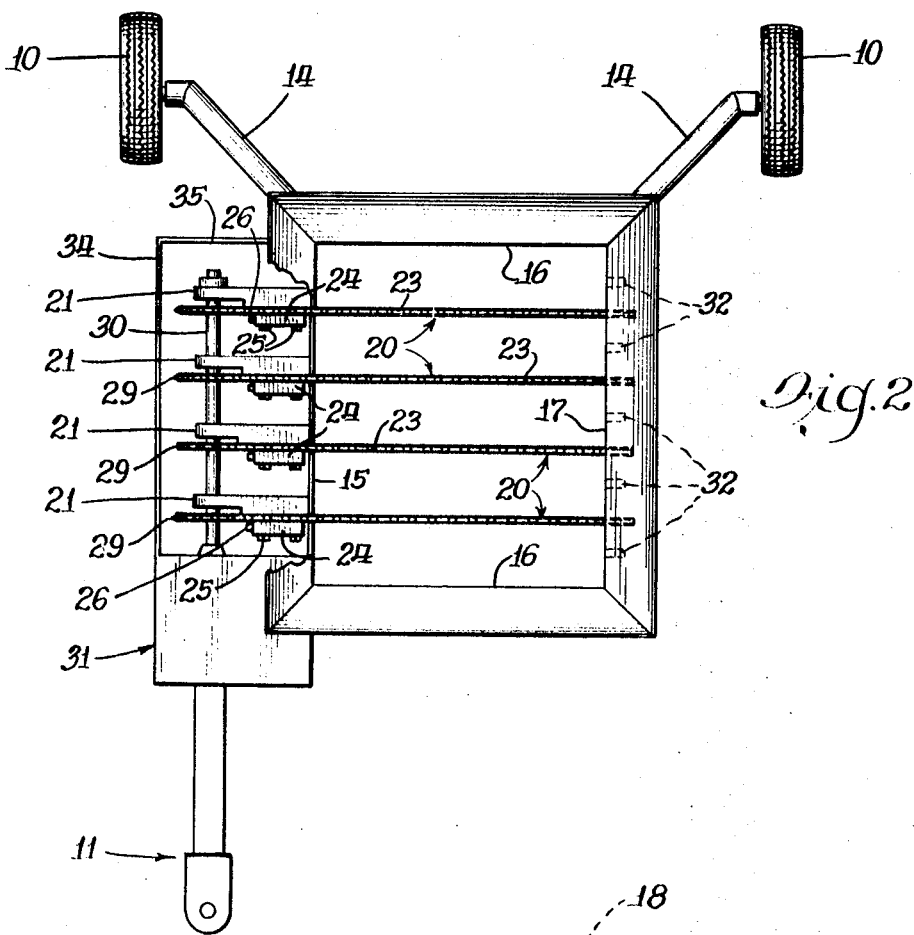
Figure 1:
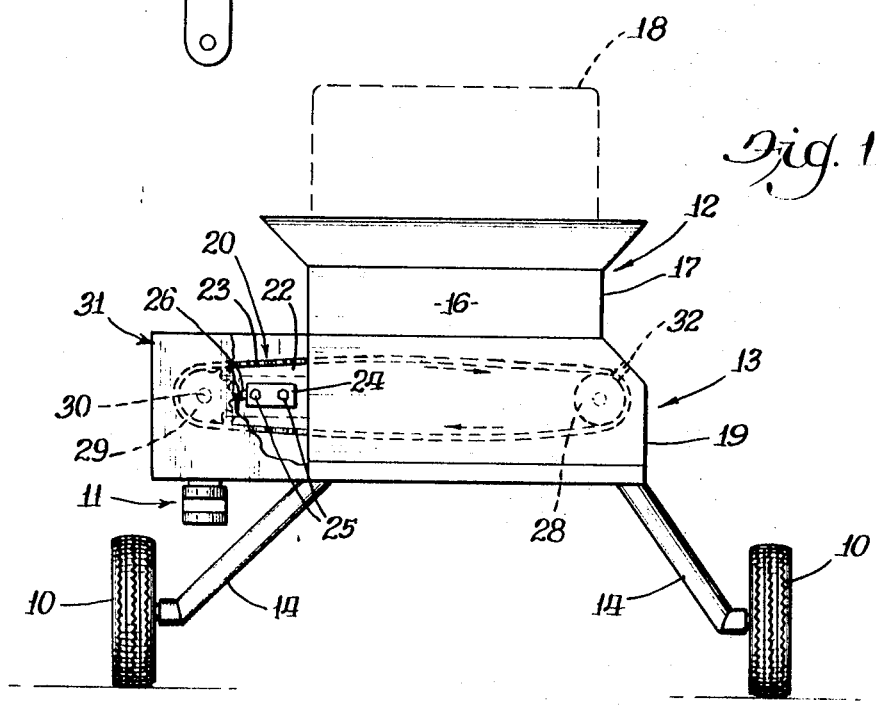

FIG. 1 is an end elevational view of one embodiment of the present invention; and FIG. 2 is a top plan view of the structure shown in FIG. 1.

Generally, the present invention is intended to be used in livestock-feeding arrangements where it is necessary or desirable that bales of hay be broken up into relatively small masses for feeding livestock. Mechanical equipment for conveying feed to livestock often requires that the feed be delivered to the equipment in separate small masses to enable the equipment to distribute the feed uniformly to a group of animals. Bales of hay present unique problems for automatic conveying and feeding equipment. It is usual that hay is cut, compressed and tied in rectangularly shaped bales with most of the hay stalks in the bale being substantially aligned in the same direction. That direction is further usually perpendicular to the longitudinal axis of the bale. When the twine holding a bale of hay together is removed, a bale of hay will not simply fall apart, but will generally tend to stay together in a conterminous mass as a series of interlocked hay wafers. Thus a bale of hay can not be presented to livestock-feeding equipment merely be removing the baler twine without further pulling or breaking apart the mass into separate smaller masses. In breaking up or otherwise working a bale of hay it is further desirable that the hay remain in a palatable condition. Many chopping or milling machines will so destroy the characteristic form of hay that it is rendered unpalatable to livestock. The present invention uniquely solves the problem of breaking up bales of hay for livestock conveying and feeding equipment by quickly, economically and efficiently cutting baled hay into relatively small uniform hay masses without destroying the characteristic form of the hay.

The embodiment of the invention disclosed in FIGS. 1 and 2 is portable and may easily be moved about on the wheels 10 by connecting the tongue 11 to the draw bar of a tractor.

The embodiment shown further comprises a housing having an upper bale-receiving section 12 and a lower bale-cutting section 13. Bales of hay to be cut are deposited in the top of the cutter and the cut hay falls from the underside of the cutter in small uniform masses. The wheels 10 are connected to struts 14 which support the cutter spaced above the ground. This arrangement permits the cutter to be positioned over a conveyor so that as the hay is cut it will fall onto the conveyor and be carried away to livestock-feeding equipment.

The upper bale-receiving section 12 is flared outwardly at its upper end so that a bale of hay may be easily directed into the cutter. The sidewalls 15, 16 and 17 of the section 12 of the housing immediately below the flared portion are rectangularly arranged to conform to the cross-sectional shape of a bale of hay taken in a plane perpendicular to the longitudinal axis of the bale. A standard rectangular bale of hay is also generally shaped so that in the rectangular cross section the sides parallel to the direction of the hay stalks in the bale are longer than the other two sides. This arrangement requires that the sidewalls 15 and 17 be longer than the walls 16; and, when a bale of hay, shown at 18 in FIG. 1, is deposited in the section 12, the hay stalks in the bale will be positioned parallel to the walls 15 and 17.

The bale-cutting section 13 of the housing has three sidewalls which are generally vertically aligned with the sidewalls 15 and 16. The fourth sidewall shown at 19 is bowed outwardly of the plane of sidewall 17 to receive the extending ends of the cutting chain assemblies 20. The upper and lower sides of the section 13 are open and the interior of the section 13 thereby defines a bale-cutting chamber.

The cutting chain assemblies 20 are carried on the outward side of the wall of the section 13 below the wall 15 of section 12, and the assemblies 20 extend through slots in the wall and toward wall 19. The assemblies 20 are positioned in a parallel spaced apart relationship and have a length sufficient to span the bale-cutting chamber and to extend outwardly of the plane of wall 17.

Each assembly 20 comprises a mounting plate 21 which is secured to the outward side of the wall of section 13. The cutter bars 22, which carry each continuous cutting chain 23, are secured to the plates 21 by a plate 24 and fasteners 25. The cutter bars 22 have elongated holes through which the fasteners 25 project into the plates 21. A screw and cam assembly 26 carried in each plate 24 and engaging one of the elongated holes in each cutter bar 22 permits adjusting movement of the cutter bars 22 along the longitudinal axis thereof.

The extending or forward end of each cutter bar 22 has a roller 28 carrying the chain 23 thereabout. At the other or rearward end of each cutter bar 22, the chain 23 is carried around a driving sprocket 29. The driving sprockets 29 are keyed to a shaft 30. The shaft 30 is rotatively carried in bearings in the rearwardly extending ends of the plates 21.

From the foregoing it may be seen that the assemblies 26 in adjusting the position of the cutter bars 22, relative to the plates 21 and sprockets 29, provide a chain tensioning adjustment for each of the cutter assemblies 20. The fasteners 25 must be loosened when the assemblies 26 are adjusted.

A motor or engine 31 is carried on the section 13 and is drivingly connected to the shaft 30 to provide power means for operating the cutting chain assemblies 20. A gearing assembly with an input shaft which can be connected to the power takeoff shaft of a tractor can be substituted for the engine 31. The power means 31 rotates the shaft 30 so that the cutting chains 23 are driven about the cutter bars 22 in the direction shown by the dotted arrows in FIG. 1, that is with the upper flight of the chain 23 moving toward the wall 19 of the section 13. This arrangement minimizes the possibility of hay accumulations in the slots in the wall of the section 13 through which the cutter assemblies 20 project. In operating the bale cutter of the invention there is a tendency for the hay to be carried toward the wall 19 as the hay is cut and dropped from the underside of section 13. Fingers 32 secured to the wall 19 extend between adjacent cutter assemblies 20 to prevent hay from accumulating in the section 13 between the ends of the assemblies 20 and the wall 19. The fingers 32 do not extend inwardly of the plane of the wall of section 12.

Guard walls 34 and 35 and a cover (not shown) enclose the rearward ends of the cutter assemblies 20. The space below the assemblies 20 is open.

Having described the invention, what is considered new and desired to be protected by Letters Patent is:

I claim:

1. A hay bale cutter comprising a housing having one end shaped to receive and guide a bale of hay through said housing and having the opposite end thereof open to release cut hay therefrom, said housing further having a bale-cutting chamber between said ends, a plurality of hay cutters, each of said hay cutters being formed to cut substantially along a straight line, said housing having a plurality of slots opening into said bale-cutting chamber, means mounted on the exterior of said housing for carrying said cutters through said slots so that each of said cutters extends substantially linearly across said bale-cutting chamber and in a spaced apart relationship to each other, and means carried on the exterior of said housing for operating said cutters to cut a bale of hay deposited in said one end of said housing.

2. In a hay bale cutter as defined in claim 1 for a rectangularly shaped bale of hay in which the hay stalks in the bale are substantially positioned parallel to the sides of greater length in a cross section of the bale taken perpendicular to the longitudinal axis of the bale, comprising an axial portion of said one end of said housing being rectangular in shape to substantially conform to the rectangular cross section of the bale taken perpendicular to the longitudinal axis of the bale, and said cutters being positioned in a substantially parallel spaced apart relationship to span said chamber in a direction perpendicular to the sides of said axial portion of said housing of greater length, whereby said cutters are operable to cut said rectangularly shaped bale of hay perpendicular to the axes of the hay stalks thereof.

3. In a hay bale cutter as defined in claim 2, wherein each of said cutters comprises a continuous cutting chain carried on a cutter bar for cutting movement circumferentially about said cutter bar in the plane of said cutter bar.

4. A hay bale cutter comprising a housing having one end shaped to receive and guide a bale of hay through said housing and having the opposite end thereof open to release cut hay therefrom, said housing further having a bale-cutting chamber between said ends, a plurality of hay cutters, means mounted on said housing for carrying said cutters to extend across said bale-cutting chamber in a spaced apart relationship to each other, and means carried on said housing for operating said cutters to cut a bale of hay deposited in said one end of said housing, an axial portion of said one end of said housing being rectangular in shape, said cutters being positioned in a substantially parallel spaced apart relationship to span said chamber in a direction perpendicular to the sides of said axial portion of said housing of greater length, each of said cutters comprising a continuous cutting chain carried on a cutter bar for cutting movement circumferentially about said cutter bar in the plane of said cutter bar, and a plurality of mounting plates for said cutter bars mounted on the exterior of said housing to carry said cutters extending through slots in one sidewall of said chamber, the sidewall of said chamber opposite from said one sidewall being spaced outwardly of the contiguous sidewall of said axial portion of said one end of said housing to receive the extending ends of said cutters, a plurality of hay blocking finger means mounted on the sidewall of said chamber receiving said extending ends of said cutters to extend between said extending ends of said cutters and short of the plane of said contiguous sidewall, and said means for operating said cutters being formed to direct said cutting chains on the side of said cutter bars toward said one end of said housing in a direction from said one sidewall of said one sidewall of said chamber to said opposite sidewall across said chamber.

5. In a hay bale cutter as defined in claim 4, said means for operating said cutters comprising a shaft rotatably carried through said mounting plates, a plurality of chain driving sprockets keyed on said shaft in a parallel spaced apart relationship corresponding to the spacing of said cutters and in the planes of said cutter bars, each of said cutting chains engaging one of said sprockets.

6. In a hay bale cutter as defined in claim 5, and tensioning means carried on each of said mounting plates for adjustably moving said cutter bars away from said sprockets to adjust the tension of said cutting chains.